UNITED STATES PATENT OFFICE.

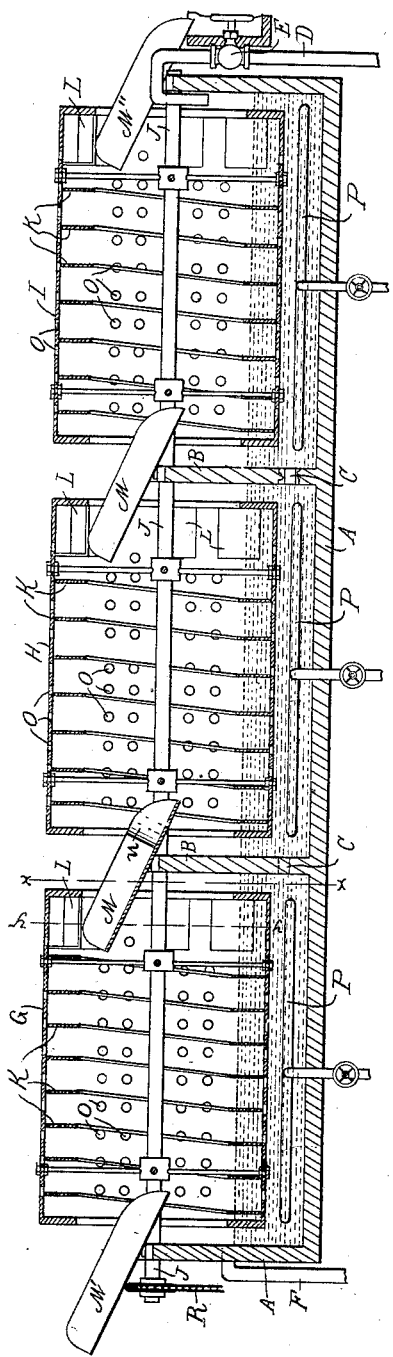

CLARENCE H. PLUMMER, OF WAUKESHA, WISCONSIN.

METHOD OF BLANCHING PEAS, &c.

SPECIFICATION forming part of Letters Patent No. 697,272, dated April 8, 1902.

Application filed July 20, 1900. Serial No. 24,280. (No specimens.)

*To all whom it may concern:*

Be it known that I, CLARENCE HOUGHTON PLUMMER, a citizen of the United States, residing at Waukesha, county of Waukesha, and State of Wisconsin, have invented new and useful Improvements in Methods of Blanching Peas and other Vegetables, of which the following is a specification.

My invention relates to improvements in methods of blanching peas and other vegetables.

The object of my invention is to provide for more thoroughly cleansing and preparing vegetables for canning.

In the following description and explanation of my improved method reference is had to the accompanying drawings, illustrating one form of mechanism by means of which my improved method can be practiced, this mechanism being made the subject of a separate application bearing even date herewith, executed by me preparatory to obtaining Letters Patent of the United States therefor.

In the drawings, Figure 1 is a longitudinal sectional view of the mechanism for carrying out my process. Fig. 2 is a cross-sectional view drawn on line *x x* of Fig. 1. Fig. 3 is a cross-sectional view of one of the rotating chambers, drawn on line Y Y of Fig. 1. Fig. 4 is a top view of one of the chutes.

Like parts are identified by the same reference-letters throughout the several views.

As the apparatus shown in the drawings is more especially adapted to the blanching of peas, I shall describe it with reference to peas alone, it being obvious that the same method may be employed with modified apparatus for any other vegetables requiring the same treatment.

It is well known that the operation of cleansing and preparing peas known to proprietors of factories as "blanching" is a difficult operation, owing to the fact that the peas are in a soft condition due to the boiling to which they are subjected and are easily crushed. Hence the practice usually followed is to simply immerse them in boiling water for a required period and then remove them to the cans; but this process is open to the objection that the water becomes very impure, and as the peas are not in motion the scum and other impurities do not become thoroughly separated from the peas. By my improved process, however, the peas are rolled through boiling water in a series or succession of chambers, whereby they are not only boiled and cleansed by the direct action of the water, but the impurities are separated by the contact of the peas with each other and with the walls of the chambers. By stating that the peas are rolled through the water I mean that they are caused to roll freely by the action of gravitation instead of being pushed or scraped along by conveyers, such as are sometimes employed for other vegetables which do not easily crush or in cases where the crushing of the vegetables is immaterial; but I do not limit the scope of my invention absolutely to a rolling process, as it is obvious that the vegetables may be otherwise lifted and depressed while passing through the water in a manner to thoroughly wash and cleanse them by frictional contact with the water itself and without exposing the vegetables to the pressure of relatively moving mechanism. My invention also contemplates the movement of the water in a direction opposite to that taken by the peas, whereby the last chambers of the series into which the peas are passed contain fresh or pure water, the impurities being carried by the flow of the water in the opposite direction from that in which the peas are moving.

To carry out my improved method, I preferably provide a water-tank A, subdivided into a series of compartments by partitions B, the latter being provided with apertures C, communicating between the compartments.

D is an inlet supply-pipe through which water is discharged into the tank, the flow being regulated by means of a valve E.

F is a discharge-pipe for carrying off the water from the compartment opposite that into which the inlet-pipe discharges.

G, H, and I are cylindrical chambers supported in the respective compartments of the tank A by means of a shaft J. Each of these compartments is provided with an internal rib or flange K, extending in spiral form around the compartment from one end to a point near the other end, where a series of buckets L are arranged on the interior wall of the chamber. These buckets are located at the opposite end of the chamber from that at which the peas enter and are adapted to lift the peas from the bottom of the chamber to a point near the top, where the change of angle in the floor of the bucket permits their discharge, as illustrated in Fig. 3. The peas are fed into the initial chamber G through a chute M' and are caused to roll through the body of water N at the bottom of the chamber from one end of the chamber to the other by means of the spiral rib or flange K. When the peas reach the opposite end of the chamber, they enter the buckets L and are lifted thereby out of the water and discharged into the chute M, which conveys them into the next chamber H, where the operation is repeated and the peas similarly discharged into the chamber I, where the same operation is again repeated and the peas discharged through the chute M" into any suitable form of receptacle.

The walls of the respective chambers G, H, and I are preferably provided with perforations O, through which the water of the various compartments of the tank A is permitted to freely enter. The water may be kept at the proper temperature by means of steam-pipes P.

While I have described my process as practiced with the apparatus shown in the accompanying drawings, it is obvious that a great variety of devices may be employed for carrying out my invention, and I therefore claim the same broadly in this application independently of any specific style of apparatus which may be used.

I attach great importance to that feature of my method which involves the passage of the peas in a continuous stream through successive baths of heated water. By the term "continuous" I do not mean absolute continuity, as it is obvious that the peas might be conveyed in successive pockets or buckets by means of belt conveyers or similar devices, whereby the operation of blanching could be continuously carried on without departing from the scope of my invention.

What I claim as new, and desire to secure by Letters Patent, is—

1. The method of blanching peas or other vegetables, which consists, first, in using heated water successively in a series of compartments to soften the vegetables and facilitate the separation of the deleterious portions; and, second, causing the vegetables to move through the several compartments from the last water-receiving compartment toward that in which the water is first admitted.

2. The method of blanching peas and other vegetables, which consists, first, in using heated water successively in a series of compartments to soften the vegetables and facilitate the separation of the deleterious portions; second, causing the vegetables to move through the several compartments in a direction opposite to that taken by the water; and, third, causing the vegetables to travel back and forth in the water of each compartment at an angle to their general line of travel.

3. The method of blanching peas and other vegetables, which consists, first, in using heated water successively in a series of compartments to soften the vegetables and facilitate the separation of the deleterious portions; second, causing the vegetables to move through the several compartments in a direction opposite to that taken by the water; and third, conveying the vegetables freely along in the water of each compartment by means of a supporting element, acting upon them at an angle to their general line of advance.

4. The method of blanching peas and other vegetables, which consists, first, in using heated water successively in a series of compartments to soften the vegetables and facilitate the separation of the deleterious portions; second, conveying the vegetables freely along in the water by means of a supporting element acting to lift them at an angle to the general line of advance, but permitting them to roll freely by gravitation in the opposite direction and toward the point of discharge.

5. The method of blanching peas and other vegetables which consists in using heated water to soften them and facilitate the separation of impurities; and, second, causing them to roll in such water upon a supporting element, acting to continuously lift them and permit their free descent by gravitation whereby the impurities are removed by the separate attrition of the heated and softened vegetables in the water and upon the contacting surfaces of the supporting element.

6. The method of blanching peas and other vegetables which consists, first, in using heated water successively in a series of compartments to soften the vegetables and facilitate the separation of the deleterious portions; and, second, rolling the vegetables through the water of the several compartments in a direction opposite to that taken by the water in passing through said series.

In testimony whereof I affix my signature in the presence of two witnesses.

CLARENCE H. PLUMMER.

Witnesses:
JAS. B. ERWIN,
L. C. WHEELER.